United States Patent [19]

Stolper

[11] 4,147,386
[45] Apr. 3, 1979

[54] MOTOR VEHICLE SEAT

[75] Inventor: Richard Stolper, Ginsheim-Gustavsburg, Fed. Rep. of Germany

[73] Assignee: General Motors Corporation, Detroit, Mich.

[21] Appl. No.: 854,801

[22] Filed: Nov. 25, 1977

[30] Foreign Application Priority Data

Dec. 8, 1976 [DE] Fed. Rep. of Germany ....... 2655535

[51] Int. Cl.² .......................... A47C 1/025; B60N 1/04
[52] U.S. Cl. ..................................... 297/362; 297/379
[58] Field of Search ................ 297/361, 362, 366–369, 297/379, 216, 354, 355, 370, 371

[56] References Cited

U.S. PATENT DOCUMENTS

| 2,873,794 | 2/1959 | Leslie et al. | 297/379 |
| 3,432,880 | 3/1969 | Putsch et al. | 297/366 X |
| 3,432,881 | 3/1969 | Putsch et al. | 297/366 X |
| 3,848,923 | 11/1974 | Dehler | 297/366 |
| 3,900,225 | 8/1975 | Wirtz et al. | 297/367 |
| 3,972,564 | 8/1976 | Arlauskas et al. | 297/379 X |

FOREIGN PATENT DOCUMENTS

| 2446181 | 5/1976 | Fed. Rep. of Germany | 297/366 |
| 2604489 | 8/1976 | Fed. Rep. of Germany | 297/362 |

Primary Examiner—Roy D. Frazier
Assistant Examiner—William E. Lyddane
Attorney, Agent, or Firm—K. H. MacLean, Jr.

[57] ABSTRACT

A motor vehicle seat comprises a pivotal hinge fitting having a fixed component connected to a seat portion, a pivotable component connected to a back-rest, a pivot pin connecting the fixed component to the pivoted component, a toothed part rotatably mounted on the pivot pin, and fine-adjustment means on the pivotable component operable to pivot the pivotable component to adjust the angle of the back-rest relative to the seat portion. The pivotal hinge fitting also includes means on the fixed component to limit turning of the toothed part in a direction corresponding to movement of the back-rest away from the seat portion, an inertia pawl mounted on the fixed component and engageable with the toothed part to prevent the movement of the back-rest towards the seat portion, fine-adjustment limit means to prevent movement of the back-rest towards the seat portion by the operation of the fine-adjustment means exceeding a point at which the centre of gravity of the back-rest reaches a predetermined angle to a vertical axis extending through the pivot pin of said hinge fitting and a manually-operable pawl-release lever for forcing disengagement of the inertia pawl from the toothed part if necessary.

3 Claims, 5 Drawing Figures

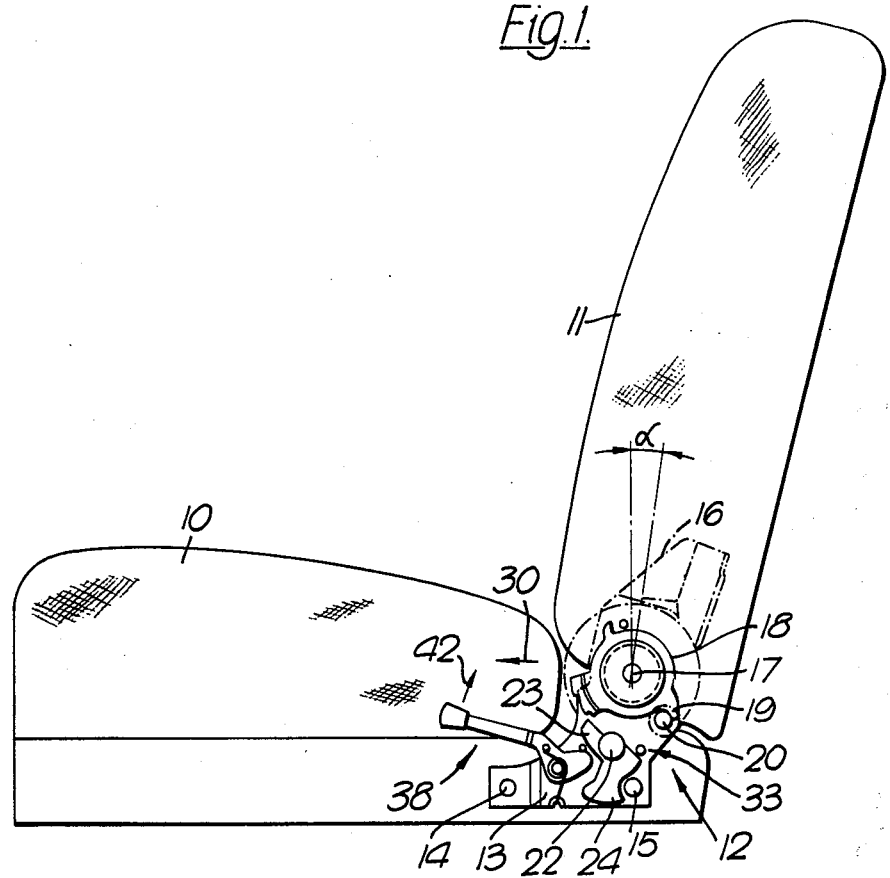
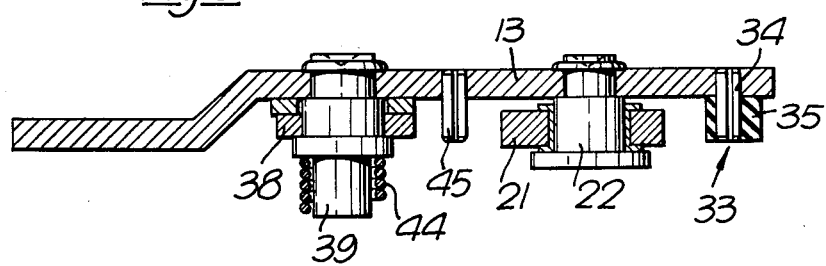

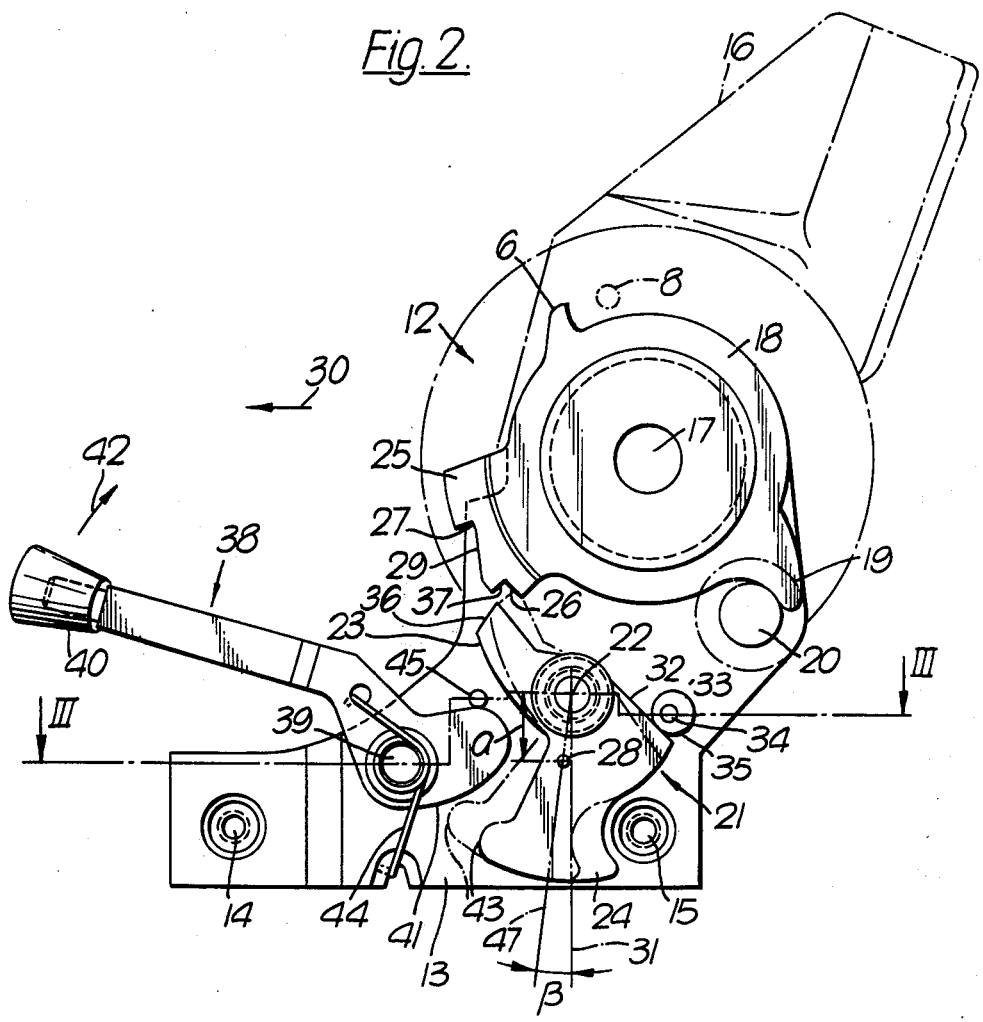

MOTOR VEHICLE SEAT

The invention relates to a hinged fitting for a motor vehicle seat having a fixed component connected to a seat portion of the seat, and a pivotable component mounted on the fixed component and connected to the back-rest of the seat, the pivotable component being provided with means which engage in a toothed part rotatably mounted about the pivotal point on the fixed part and which, when operated, bring about a pivotal movement of the component connected to the back-rest.

Such a hinged fitting is already known from U.S. Pat. No. 3,432,881. This hinged fitting permits a fine adjustment of the back-rest with respect to the fixed hinged fitting on the seat. Moreover, it possesses a so-called free swivelling arrangement for the back-rest. This works in such a manner that, when an arresting pawl is released by hand, the toothed part, which is rotatably mounted on the fixed fitting and is in effective connection with the hinged fitting, is freely swivellable with the back-rest. The free swivelling arrangement has for its objects to facilitate the entry of rear-seat passengers into the vehicle by ensuring that the back-rest can be swung completely forwards.

Furthermore, U.S. Pat. No. 2,737,229 discloses the idea of making the front seats of motor vehicles freely pivotable in a forward direction in a motor vehicle. However, the fittings for these seats have no fine adjustment for the exact setting of the position for back-rest and seat. The seat fittings are so designed that in the normal case, they are freely pivotable in the forward direction, but under severe deceleration of the vehicle (as is the case, for example, under intense braking or during impact situations) they are firmly secured in their rearward position by locking means responding to deceleration, thus preventing injury to persons occupying the front seats, due to the rear-seat passengers being hurled forwards under such severe deceleration conditions.

The object of the present invention is to create a seat fitting which, on the one hand, permits a fine adjustment between seat and back-rest, but in which, on the other hand makes possible a free forward pivoting of the back-rest without a previous unlocking action (i.e. without the free swivelling device), and in which, nevertheless, a forward impelling of the back-rest during sudden deceleration of the vehicle is avoided.

According to the invention, this object is attained by arranging that in the direction of rotation corresponding to a rearward movement of the back-rest, a toothed part connected to the back-rest contacts a stop and, for the direction of rotation corresponding to a forward movement of the back-rest, said toothed part is provided with a notching in which a pendulum-shaped pawl, mounted on a fixed component of the seat, engages during appropriate deceleration of the vehicle, whilst means are provided which limit the forward displacement of the back-rest before the centre of gravity thereof reaches a vertical axis extending through the pivot point of the back-rest.

The invention therefore combines the advantage of providing a simple clear opening permitting easy access to the rear seat positions by the forward movement of the front seat back-rests without a requirement for the previous manual unlocking of a free swivelling device, along with the advantage that, during the subsequent folding back of the front seat back-rests, these back-rests again arrive in the position which has been previously chosen by the driver or his companion passenger, with the aid of the fine adjustment device, and which can be varied in simple manner by the fine setting. If severe decelerations of the travelling vehicle occur, then in this case, undesirable forward movements of the back-rests of the front seats are prevented.

With the hinged fitting according to the invention, the fine adjustment of the back-rest in forward direction must be limited, because if the centre of gravity of the back-rest were to move forwardly through the vertical axis extending through the pivotal point, the back-rest would fall forwards. However, not only will this limitation be required to avoid this possibility, but will, in addition, be required also to ensure that the back-rest will not fall forwards merely under the slightest acceleration, i.e. just before the arresting pawl responds to the acceleration.

For this reason the invention further proposes that limitation of the adjustment of the back-rest in the forward direction should occur at an angle of about 15° to the vertical axis through the back-rest pivot point.

This limitation may be effected in different ways, e.g. the means for the fine adjustment of the back-rest may be so designed as to restrict the forward adjustment movement. According to a further feature of the invention however, the means for limiting the forward displacement of the back-rest consists of a stop mounted on the toothed part and of a pin arranged on the pivotable fitting.

Advantageously, the arresting pawl is provided with a pendulum weight underneath its point of rotation, in a manner known per se. In the rest position, it lies against a stop mounted on the fixed component and in such a way that its centre of gravity lies in front of a vertical axis extending through the point of rotation of the arresting pawl. In addition, there is provided a manually-operable pawl-release lever for forcing disengagement of the arresting pawl if necessary.

Further objects and advantages of the present invention will be more readily apparent from the following detailed description, in which preferred embodiments of the invention are illustrated with reference to the accompanying drawings, in which;

FIG. 1 shows a vehicle seat in side elevation with a hinged fitting according to the invention;

FIG. 2 shows the hinged fitting according to FIG. 1 in side elevation, to an enlarged scale;

FIG. 3 is a section along the line III—III in FIG. 2;

Figure 4:
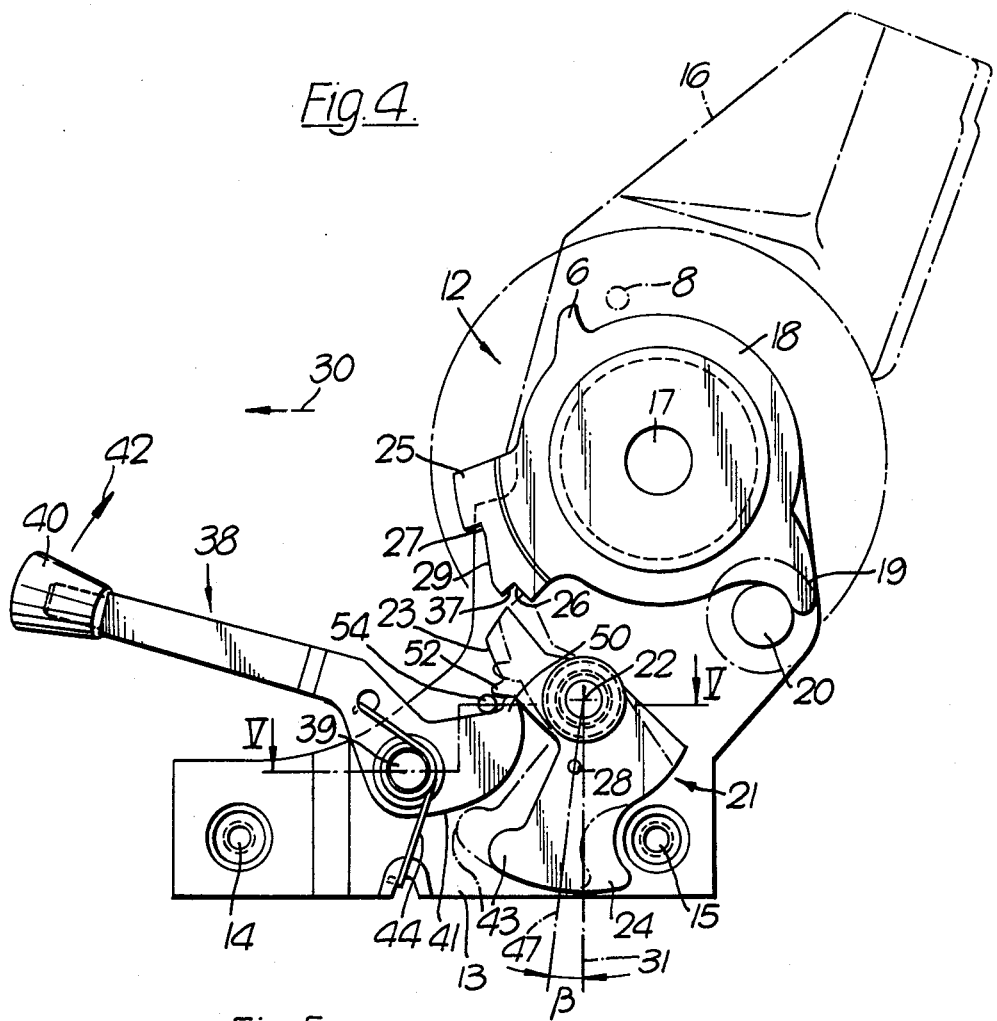
FIG. 4 is a view corresponding to FIG. 2 of a second embodiment of the invention.

In FIG. 1, reference numeral 10 designates a seat face and reference numeral 11 a back-rest of a motor vehicle seat, e.g. of a front seat in a passenger car. The back-rest 11 is arranged to be angularly movable with respect to the fixed seat face 10, by means of a hinged fitting 12. This fitting 12 will be more clearly apparent from the enlarged presentation according to FIG. 2. It consists of a fixed component 13 which, at 14 and 15, is connected to the fixed seat part 10, e.g. by screwing, and of a movable component 16 which is attached to the back-rest 11. The pivot axis of the movable component 16 with respect to the fixed component 13 (and therefore at the same time, also the pivotal axis of the back-rest with respect to the fixed seat part 10) is designated by the reference numeral 17.

As will be seen particularly from FIG. 2, there is positive interaction between the movable component 16 and a toothed part 18 which is likewise rotatable about the axis 17. The toothed part 18, is engaged by a means through which a movement or displacement of the back-rest 11 with respect to the toothed part 18 is brought about. This movement is designated as a fine adjustment movement. The adjusting means takes the form of a worm for example, if the toothed part 18 is designed as a worm wheel for at least part of its periphery. Further, the component 16 may also be provided with a spur gear wheel which co-operates with an inner gear toothing of the toothed part 18, whilst the addendum circle of the spur wheel is smaller, by at least the height of a tooth, than the root circle of the inner gear toothing. This latter component or the component 16, is mounted on a rotatable eccentric. These means for fine adjustment do not form part of the invention and are therefore not illustrated in detail.

Arranged on the toothed part 18, there is a lug-shaped extension 19 which rests against a stop 20 mounted on the fixed component 13. This defines the position of the toothed part with respect to the fixed component. In other words, since the back-rest 11 is usually inclined rearwards by about 25° with respect to the vertical, the extension 19 remains resting against the stop 20, even when there is a back-rest adjustment by the usual amount. In order to attain this with certainty, and above all to ensure that the back-rest 11 does not swing forward merely at the slightest deceleration of the vehicle, care is taken to make sure that the back-rest can only be pivoted forward by the fine adjustment mechanism as far as a certain predetermined angle. This angle, designated in FIG. 1 by $\alpha$, is from 12° up to 15°, depending upon the weight and the position of the centre of gravity of an arresting pawl 21, i.e. upon the deceleration value with which the pawl 21 responds, as will be explained later, below. The deceleration value, which is the deciding factor for the folding forward of the back-rest, must therefore be greater than that which is decisive for the response of the pawl 21.

In the example, limitation of the fine adjustment of the back-rest 11 in forward direction is brought about by a stop 6 on the toothed part 18 against which a pin 8 on component 16 engages.

As will be seen from the drawing, particularly FIG. 2, the arresting pawl 21 is mounted pivotally about an axis 22 on the fixed component 13 below the toothed part 18. This pawl 21 consists in the main of an arresting catch 23 and a pendulum portion 24. The toothed part 18 has a counter-catch 25 which co-operates with the arresting catch 23 of the arresting pawl 21. To fulfil its purpose, the counter-catch 25 is provided with two recesses 26, 27 which are matched in shape to that of the catch 23 of the arresting pawl 21 and are provided for engagement of the latter.

In the withdrawn position of the pawl 21 shown in FIG. 2, there is no engagement with the counter-catch 25 of the toothed part 18. Hence in this normal case, the back-rest 11 together with a movable component 16 and the toothed part 18, are freely swivellable in a forward direction, i.e. anti-clockwise, as seen in FIG. 2. On the other hand, with the position of the arresting pawl as indicated in dash-dot lines, the catch 23 snaps into the recess 26 of the counter-catch 25 of the toothed part 18. In this case, the toothed part 18, and therefore also the back-rest 11, is locked against pivoting forward.

The arresting device operates as follows:

The weight distribution of the pawl 21 is so disposed that the centre of gravity of the pawl (designated by 28) lies below the pivotal axis 22. The main weight of the arresting pawl 21 is therefore concentrated in the pendulum weight 24 of the pawl.

The normal direction of travel of the vehicle is identified by an arrow 30 in FIG. 2. Now if a severe deceleration of the vehicle takes place, e.g. as a result of powerful braking or of impact of the vehicle against an obstacle, then the pendulum weight 24 of pawl 21, concentrated in the centre of gravity 28, exerts a turning moment on the arresting pawl in clockwise direction, owing to mass inertia. The effective leverage here is denoted by a. Due to this turning moment, the catch 23 of pawl 21 is brought into engagement with the recess 26 of the counter-catch 25 and the back-rest 11 is locked against swivelling forwards.

If, at the time when the deceleration of the vehicle arises, the back-rest 11 should be already in a somewhat forwardly swung position, then, even in this case, the pawl 21 with its catch 23 may still engage in the second recess 27 of the counter-catch and can therefore block the back-rest 11 against further forward swivelling. Engagement of the catch 23 in the recess 27 is here facilitated by an oblique face 29 on the counter-catch 25.

A soon as the deceleration of the vehicle has appropriately diminished, the arresting pawl 21 automatically returns to the initial position, i.e. the catch 23 moves out of the recesses 26 or 27.

From FIG. 2, it will be further apparent that, in the normal case, i.e. with the catch 23 unlocked, the arresting pawl 21 rests with a rearward oblique face 32, against a stop 33. The stop 33 consists of a pin 34 which is pressed into a cavity in the component 13 and is covered with a short piece 35 of rubber tubing. The stop 33 is so arranged that the centre of gravity 28 of the arresting pawl 21 is situated to the left of the vertical line 31 in FIG. 2, so that a slight biasing moment in anti-clockwise direction is always exerted on the pawl 21. The result is that, in the normal condition of the vehicle, i.e. travelling on a horizontal road without appreciable acceleration, or when the vehicle is at a standstill, this biasing moment always keeps the pawl 21 in contact with the stop 33. Under normal travelling conditions of the vehicle, a to-and fro rocking movement of the pawl 21 is to be avoided. The imaginary line passing through the pivotal point 22 of the pawl 21 and through its centre of gravity 28, includes includes an angle $\beta$ of about 10° with the vertical line 31.

Cases are conceivable in which an automatic unlocking of the arresting pawl 21 does not take place because the disengagement of the engaging catch 23 from the recess 26 is prevented by a frictional lock between the respective faces 36 and 37 of the pawl and catch. This would be the case, for example, when the vehicle is on a steeply sloping road, and/or if a passenger located behind the seat exerts a forwardly directed pressure on the back-rest 11, e.g. by leaning on same. In order to make possible a release of the arresting pawl 21 even in this case, a release lever 38 is provided, which is rotatably mounted on a pivot 39 on the fixed component 13, the release lever 38 is manually operated and for this purpose it carries a knob 40 at its front end. At its other free end 41 lying the other side of the pivotal axis 39, the release lever 38 is rounded off after the manner of a disc cam. Now if the release lever 38 is moved in a clockwise direction, (arrow direction 42) with the arresting pawl 21 in an engaged position, then the rounded face 41 of the release lever 38 so co-operates with a similarly rounded projection 43 on pawl 21, that this pawl is turned in an anti-clockwise direction and is thereby brought out of engagement with the counter-catch 25 on the toothed part 18. A spring 44 which encloses the pivot 39 and loads the release lever 38, is given an initial tension which serves to move the release lever 38 back again into its lower end position shown in FIG. 2 after it has been released. The release lever 38 is secured in this lower end position by a pin-form stop 45 on the fixed component 13.

It will be apparent that, through the position of the centre of gravity 28 of the arresting pawl 21, it is possible to determine at what deceleration the pawl responds, i.e. when it arrests the toothed part 18 and therefore locks the back-rest 11 against pivoting forwards. The position of the centre of gravity 28 also determines at which descending gradiant the pawl 21, or rather its catch 23, moves into the recess 26 or 27, thus locking the back-rest 11 against moving forwards, even without deceleration. Under certain circumstances, this may take place in dependence upon a deceleration of about 0.3 g at a gradient of about 23%.

Now it may happen, for example, when small children or dogs are being conveyed on the rear seat, that it is desirable to secure the back-rest of the front seats against being folded forwards, even during normal driving conditions or when the vehicle is stationary. This may be done for example by providing the stop 33 (FIG. 2) with a piece of tubing 35 which is eccentric in such a way that by twisting it, the arresting pawl 21 engages continuously with the counter-catch 25. Moreover, the position of line 47 passing through the centre of gravity 28 may of course be altered thereby for the purpose of adjusting the sensitivity of the pawl.

Figure 5:
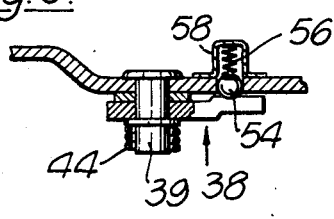
FIG. 5 is a section along the line V—V in FIG. 4.

Another embodiment of the invention is illustrated in FIG. 4. Here the release lever 38 is provided with a lug 50 which co-operates with a projection 52 on pawl 21. The spring 44 for the release lever 38 presses the right-hand end of the lever against a ball 54 which serves as a stop or a snap point and beyond which the release lever 38 is able to move, however. The ball 54 is able to divert into a depression 58 (see FIG. 5) against the action of a spring 56. Thus if the back-rest 11 ought not to swing forward, then the release lever 38 is moved downwards by its knob 40. The snap action of ball 54 is thereby overcome and the lug 50, acting through the projection 52, moves pawl 21 so far that its catch 23 engages in the recess 26. Spring 44 keeps the release lever 38 in this position so that the locking of the back-rest 11 lasts until the release lever 38 is moved back again in clockwise direction. It will be apparent that the lug 50, corresponding with stop 33 in FIG. 2, may likewise serve as a stop for the arresting pawl 21 in the rest position. Of course, the arresting pawl may also be under the action of a spring which determines the value of deceleration for engagement of the arresting pawl with the counter-catch 25.

What is claimed is as follows:

1. A motor vehicle seat comprising a seat portion, a tiltable back-rest, and a pivotal hinge fitting pivotally securing said back-rest to said seat portion, said pivotal hinge fitting comprising a fixed component connected to said seat portion, a pivotable component connected to said back-rest, a pivot pin connecting said fixed component to said pivotable component, a toothed part having notches formed in the periphery thereof, rotatably mounted on said pivot pin, fine-adjustment means on said pivotable component engageable with said toothed part and operable to pivot said pivotable component gradually about said pivot pin, means on said fixed component to limit the rotational movement of said toothed part in a direction corresponding to a pivotal movement of the back-rest away from the seat portion, an inertia pawl pivotally mounted on said fixed component and engageable, when subjected to inertia forces of predetermined magnitude in a predetermined direction, with one of said notches in said toothed part to prevent the rotational movement of said toothed part in a direction corresponding to a pivotal movement of the back-rest towards the seat portion, a manually-operable pawl-release lever pivotally mounted on said fixed component and operable to disengage the inertia pawl from said toothed part, spring-bias means on said pawl-release lever biasing said lever against movement in a direction to disengage said inertia pawl, stop means positioned relative to the pivot point of the inertia pawl so that the inertia pawl, when disengaged from said toothed part, rests against said stop means with the centre of gravity of the inertia pawl at an angle of about 10° in front of a vertical axis extending through the pivot point of the inertia pawl, manual adjustment means for said stop means operable to engage the inertia pawl with one of said notches in said toothed part, and fine-adjustment limit means to prevent the pivotal movement of the back-rest towards the seat portion by the operation of said fine-adjustment means exceeding a point at which the centre of gravity of the back-rest reaches a predetermined angle to a vertical axis extending through the pivot pin of said hinge fitting.

2. A motor vehicle seat according to claim 1, in which the manual adjustment means on said stop means comprises an eccentric sleeve movably mounted on said stop means.

3. A motor vehicle seat according to claim 1, in which the pawl-release lever includes the stop means for the inertia pawl, there is a spring-biased lever-detent means mounted on said fixed component, and the manaul adjustment means for the stop means is provided by arranging for the pawl-release lever to override the spring-biased lever-detent means in order to displace the inertia pawl into engagement with one of said notches in said toothed part by said stop means.

* * * * *